United States Patent
Muto et al.

(10) Patent No.: US 10,249,112 B2
(45) Date of Patent: Apr. 2, 2019

(54) VEHICLE STATE MONITORING APPARATUS, VEHICLE STATE MONITORING SYSTEM, AND VEHICLE STATE MONITORING METHOD

(71) Applicant: Hitachi, Ltd., Tokyo (JP)

(72) Inventors: Kazuo Muto, Tokyo (JP); Mariko Okude, Tokyo (JP); Takehisa Nishida, Tokyo (JP); Masayoshi Ishikawa, Tokyo (JP); Atsushi Katou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/933,414

(22) Filed: Mar. 23, 2018

(65) Prior Publication Data

US 2018/0286153 A1    Oct. 4, 2018

(30) Foreign Application Priority Data

Mar. 29, 2017 (JP) .................. 2017-064563

(51) Int. Cl.

| B60Q 1/00 | (2006.01) |
| G07C 5/08 | (2006.01) |
| G05B 23/02 | (2006.01) |
| G06F 15/18 | (2006.01) |
| G07C 5/00 | (2006.01) |

(52) U.S. Cl.
CPC ......... G07C 5/0858 (2013.01); G05B 23/024 (2013.01); G06F 15/18 (2013.01); G07C 5/008 (2013.01); G07C 5/0808 (2013.01)

(58) Field of Classification Search
CPC .... G07C 5/0858; G07C 5/008; G07C 5/0866; G05B 23/024

USPC ......................................................... 340/459
See application file for complete search history.

(56) References Cited

U.S. PATENT DOCUMENTS

| 9,430,883 B2* | 8/2016 | Busse ................. G07C 5/0858 |
| 2017/0154477 A1* | 6/2017 | Chung ................. G07C 5/008 |

FOREIGN PATENT DOCUMENTS

| JP | 2014-46889 A | 3/2014 |
| JP | 2016-167112 A | 9/2016 |

OTHER PUBLICATIONS

Extended European Search Report received in corresponding European Application No. 18161493.4 dated Aug. 27, 2018.

* cited by examiner

*Primary Examiner* — Toan N Pham
(74) *Attorney, Agent, or Firm* — Mattingly & Malur, PC

(57) ABSTRACT

An object of the present invention is to grasp information regarding the state of a vehicle (for example, an automobile) that cannot be obtained from an OBD, and to monitor the state of the vehicle. An aspect of the present invention includes: a state estimation unit that estimates the state quantities of a monitoring-target vehicle based on sensor data obtained from sensors mounted on a mobile information terminal in the monitoring-target vehicle using a state estimation device that has learned the relationship between sensor data obtained from sensors mounted on a mobile information terminal in an arbitrary vehicle and state quantities of the arbitrary vehicle in advance; a state evaluation unit that executes evaluation regarding a state of the monitoring-target vehicle on the basis of the estimated state quantities of the monitoring-target vehicle; and an evaluation result output unit that outputs a result of the evaluation.

8 Claims, 14 Drawing Sheets

TIME DATA | MOBILE INFORMATION TERMINAL SENSOR DATA D1 | AUTOMOBILE STATE QUANTITY DATA D2

| TIME | S1 | S2 | ... | A1 | A2 | A3 |
|------|----|----|-----|----|----|----|
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

VEHICLE STATE MONITORING APPARATUS, VEHICLE STATE MONITORING SYSTEM, AND VEHICLE STATE MONITORING METHOD

CROSS-REFERENCE TO RELATED APPLICATION

Background

The present invention relates to a vehicle state monitoring apparatus, a vehicle state monitoring system, and a vehicle state monitoring method for monitoring states of vehicles such as automobiles.

Although a recent trend regarding automobiles shows that implements for improving the safety of users are beginning to be installed, this trend is not widely prevailing owing to the necessity of additional costs. On the other hand, in association with the growth of the distribution of goods and the expansion of car-sharing business, the utilization rates of both commercial vehicles and passenger vehicles have been increasing. Therefore, it is increasingly required that the state of an automobile should be monitored more strictly than before, the abnormal state of the automobile should be detected at its earlier stage, and the relevant driver, the relevant automobile dealer, the relevant carrying company, the relevant driving control company, or the like should be informed of the abnormal state more quickly.

In response to the above requirement, automobile safe driving assist systems utilizing information intercommunication via commonly widespread mobile information terminals such as a smart phone have been proposed (refer to Japanese Unexamined Patent Application Publication No. 2016-167112, for example). In an automobile safe driving assist system disclosed in Japanese Unexamined Patent Application Publication No. 2016-167112, data is collected in real time from an OBD (on-board diagnosis) which is a vehicle diagnosis device and linked up with a mobile information terminal. The OBD is a self-failure diagnosis function parts of which are embedded in ECUs (electrical control units) installed in various portions of an automobile. When the automobile is diagnosed as out of order, the OBD informs a user of that the automobile has been out of order by displaying an alarm or the like on the mobile information terminal, and provides the user with information for introducing the user to a nearby maintenance shop or the like.

SUMMARY

Nevertheless, in a technology disclosed in Japanese Unexamined Patent Application Publication No. 2016-167112, only data collected using the OBD is used. The OBD data includes information regarding the velocity, the rotation number of the engine of the automobile, and the like, and failure flags for components installed by an automobile manufacturing company. The components are, for example, the constituent elements of an automobile that are composed of various parts and mechanisms or composed of combinations of some parts. However, there are some failures that cannot be found from OBD data, and it is also difficult to detect unforeseen failures for which failure flags are not installed.

The present invention has been achieved with the above-mentioned problems in mind, and an object of the present invention is to grasp information regarding the state of a vehicle (an automobile or the like) that cannot be obtained from a vehicle diagnosis device mounted on a vehicle such as an OBD, and to monitor the state of the vehicle.

A vehicle state monitoring apparatus according to an aspect of the present invention includes: a state estimation unit that estimates state quantities of a monitoring-target vehicle on the basis of sensor data obtained from sensors mounted on a mobile information terminal in the monitoring-target vehicle using a state estimation device that has learned the relationship between sensor data obtained from sensors mounted on a mobile information terminal in an arbitrary vehicle and state quantities of the arbitrary vehicle in advance; a state evaluation unit that executes evaluation regarding a state of the monitoring-target vehicle on the basis of the state quantities of the monitoring-target vehicle estimated by the state estimation unit; and an evaluation result output unit that outputs a result of the evaluation regarding the state of the monitoring-target vehicle executed by the state evaluation unit.

In addition, a vehicle state monitoring system according to another aspect of the present invention includes the abovementioned vehicle state monitoring apparatus and a mobile information terminal that is equipped with sensors and installed in a monitoring-target vehicle. Furthermore, a vehicle state monitoring method according to another aspect of the present invention is a method executed in the abovementioned vehicle state monitoring apparatus.

According to at least one aspect of the present invention, information, which cannot be obtained from an OBD or the like, can be grasped and the monitoring of a vehicle can be executed with the use of sensors mounted on a mobile information terminal that is brought in the vehicle.

Problems, configurations, and advantageous effects other than those described above will be explicitly shown by explanations about the following embodiments.

BRIEF DESCRIPTION OF THE DRAWINGS

FIG. 2 is an explanatory diagram showing a configuration example of learning data according to the first embodiment of the present invention;

DETAILED DESCRIPTION

Hereinafter, some examples of embodiments for implementing the present invention will be explained with reference to the accompanying drawings. In the accompanying drawings, components that have substantially the same functions or the same configurations are given the same reference signs, and redundant explanations are omitted. Here, although the accompanying drawings show concrete embodiments and practical examples in accordance with the principle of the present invention, they are shown for the purpose of providing a better understanding of the present invention, and it is never intended that they are used to limit the present invention.

First Embodiment

Figure 1:
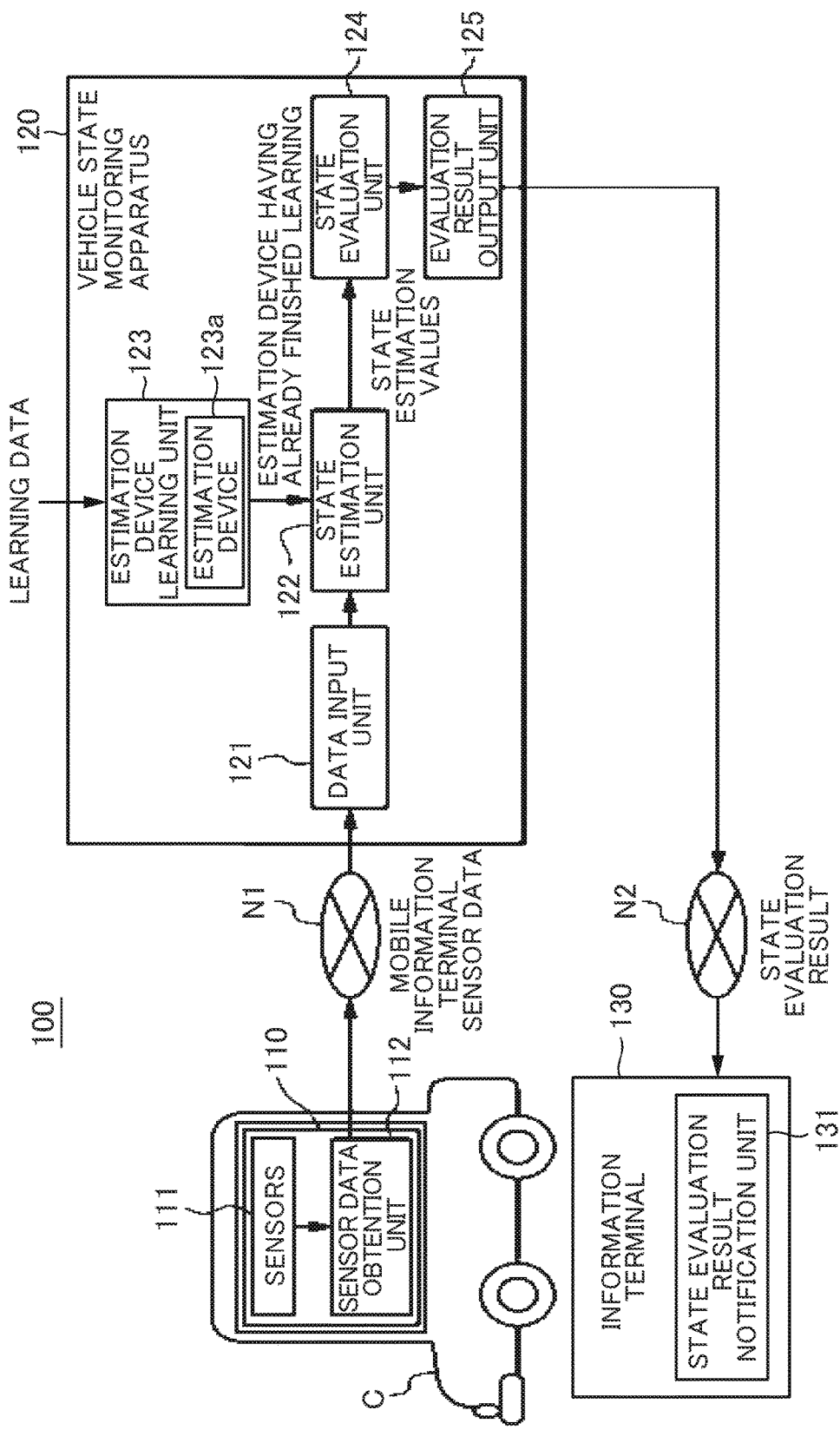
FIG. 1 is a schematic block diagram showing an example of the overall configuration of a vehicle state monitoring system according to a first embodiment of the present invention and the internal configurations of the respective devices.

FIG. 1 shows an example of the overall configuration of a vehicle state monitoring system according to a first embodiment of the present invention and the internal configurations of the respective devices.

[Vehicle State Monitoring System]

A vehicle state monitoring system 100 shown in FIG. 1 includes: a mobile information terminal 110 that is taken along by a user (a passenger); a vehicle state monitoring apparatus 120; and an information terminal 130. The mobile information terminal 110 and the vehicle state monitoring apparatus 120 are communicatably connected to each other via a network N1, and the vehicle state monitoring apparatus 120 and the information terminal 130 are communicatably connected to each other via a network N2. The network N1 is a network for a mobile communication system. The network N2 is a network for a mobile communication system, the Internet or the like. Here, the network N2 and the network N1 can be the same network.

In the vehicle state monitoring system 100, an assumption that there is the mobile information terminal 110 in an automobile C is made. The vehicle state monitoring apparatus 120 creates an estimation device 123*a* (a state estimation model, that is, an example of a state estimation device) that estimates the state quantities of the automobile C on the basis of sensor data obtained from the mobile information terminal 110 using sensor data of an arbitrary mobile information terminal and measurement data of the state quantities of the automobile C necessary for monitoring the state of the automobile C as learning data. Subsequently, the vehicle state monitoring apparatus 120 grasps the state of the automobile C, which cannot be grasped directly from an OBD, using the estimation device 123*a* and the sensor data obtained from the mobile information terminal 110, and accurately executes the state monitoring of the automobile C.

[Mobile Information Terminal]

The mobile information terminal 110 is a widespread communication implement that can be taken along by a user such as a smart phone, a tablet type terminal, or a game console. The mobile information terminal 110 is brought into an automobile C by a user. It will be assumed that the mobile information terminal 110 includes two or more sensors 111 such as an acceleration sensor, and the mobile information terminal 110 is disposed in the automobile C that is a monitoring target. The mobile information terminal 110 includes an acceleration sensor 309 and a satellite positioning unit 310 (refer to FIG. 3 to be described hereinafter) as the sensors 111. The relationship between time and a moving distance (the velocity of the automobile C) can be calculated based on the sensor data of the satellite positioning unit 310 (the sensor data of the satellite positioning unit will also be referred to as "satellite positioning data hereinafter). Subsequently, in the mobile information terminal 110, an application, which plays a role of a sensor data obtention unit 112, is executed.

The sensor data obtention 112 regularly obtains sensor data from the sensors 111, and after performing suitable processing such as resampling on the sensor data, the sensor data obtention 112 transmits the sensor data to the vehicle state monitoring apparatus 120 via the network N1. In addition, the sensor data obtention 112 can also transmit data obtained via the mobile information terminal 110 such as OBD data other than the above sensor data to the vehicle state monitoring apparatus 120.

Although the automobile C is set as a monitoring-target vehicle in FIG. 1, various kinds of movable vehicles other than the automobile C can be set as monitoring-target vehicles. For example, vehicles in conformity with the Road Traffic Law (automobiles, motorized bicycles, light vehicles, trolleybuses), streetcars, industrial vehicles, military vehicles, various industrial vehicles, and railway vehicles can be cited as monitoring-target vehicles.

[Vehicle State Monitoring Apparatus]

The vehicle state monitoring apparatus 120 is a computer including a calculation processing function and a storage function for accumulating and processing data transmitted from the mobile information terminal 110, and it is disposed, for example, in the data center of a carrying company, a driving control company, or the like. The vehicle state monitoring apparatus 120 includes a data input unit 121, a state estimation unit 122, an estimation device learning unit 123, a state evaluation unit 124, and an evaluation result output unit 125.

The data input unit 121 receives sensor data output from the sensor data obtention unit 112 of the mobile information terminal 110 via the network N1, and outputs the received sensor data to the state estimation unit 122.

The estimation device learning unit 123 creates the estimation device 123*a* (an example of a state estimation device) that has learned the relationship between sensor data output from sensors mounted on a mobile information terminal in an automobile and the state quantities of the automobile in advance, and estimates the state quantities of an arbitrary automobile. For example, as shown in FIG. 2, the estimation device learning unit 123 uses data composed of a combination of mobile information terminal sensor data D1 (sensor values) and automobile state quantity data D2 (the values of the state quantities) as learning data 200. Furthermore, the estimation device learning unit 123 executes machine learning and the like using this learning data 200, and creates the estimation device 123a that estimates the state quantities of the automobile on the basis of sensor data output from the sensors 111 included in the mobile information terminal 110. As the machine learning, a support vector machine that is one of pattern recognition models using supervised learning and makes up a two-class pattern classifier using a linear input element, deep learning that is a deep neural network, or the like can be used. Since the sizes, weights and capabilities of automobiles are different from each other according to the types of automobiles, plural estimation devices 123a are created on the basis of the types of automobiles.

(Configuration Example of Learning Data)

FIG. 2 shows a configuration example of learning data according to the first embodiment.

As shown in FIG. 2, the learning data 200 includes "Time Data", "Mobile Information Terminal Sensor Data D1", and "Automobile State Quantity Data D2". Mobile Information Terminal Sensor Data D1 includes Item S1, Item S2, and so on, and Automobile State Quantity Data D2 includes Item A1, Item A2, and Item A3. In this embodiment, Mobile Information Terminal Sensor Data D1 is acceleration data, and Automobile State Quantity Data D2 is data regarding the presence or absence of the motion of the brake of an automobile.

Returning to the explanation about the vehicle state monitoring apparatus 120 shown in FIG. 1, the state estimation unit 122 estimates state quantities that are necessary for evaluating the state of the automobile C on the basis of sensor data obtained from the sensors mounted on the mobile information terminal 110 in the automobile C using the estimation device 123a having already finished learning and is provided by the estimation device learning unit 123 (these estimated state quantities are sometimes referred to as "state estimation values" hereinafter). Subsequently, the state estimation unit 122 outputs the estimated state quantities (state estimation values) of the automobile C to the state evaluation unit 124.

Here, it becomes unnecessary to install the estimation device learning unit 123 in the vehicle state monitoring apparatus 120 by storing the estimation device 123a having already finished learning in the vehicle state monitoring apparatus 120 in advance. Alternatively, it is also conceivable that the vehicle state monitoring system 100 is configured in such a way that the estimation device 123a having already finished learning is stored in an external server or the like in the outside of the vehicle state monitoring apparatus 120, and the estimation device 123a can be brought up in the vehicle state monitoring apparatus 120 as needed.

The state evaluation unit 124 executes evaluation regarding the state of the automobile C such as safety and dangerousness on the basis of the state quantities (state estimation values) of the automobile C estimated by the state estimation unit 122. In this embodiment, the state evaluation unit 124 executes evaluation on at least one item out of the state of the brake of the automobile C (for example, the effectiveness of the brake), the present abnormality degree of the automobile C, and the transition of the abnormality degree of the automobile C.

The evaluation result output unit 125 transmits an evaluation result regarding the state of the automobile C (a state evaluation result) obtained by the state evaluation unit 124 to the information terminal 130 via the network N2.

[Information Terminal]

The information terminal 130 is a mobile information terminal such as a personal computer (PC) or a smart phone. In the information terminal 130, an application that functions as a state evaluation result notification unit 131 is executed. This information terminal 130 can be the same type of information terminal as the mobile information terminal 110.

The state evaluation result information unit 131 performs processing for displaying the evaluation result regarding the state of the automobile C transmitted from the evaluation result output unit 125 of the automobile state monitoring apparatus 120 on the screen of the information terminal 130 (refer to FIG. 9 to be described later).

[Hardware Configuration Example of Mobile Information Terminal (Information Terminal)]

Next, the hardware configuration of the mobile information terminal 110 will be explained.

Figure 3:
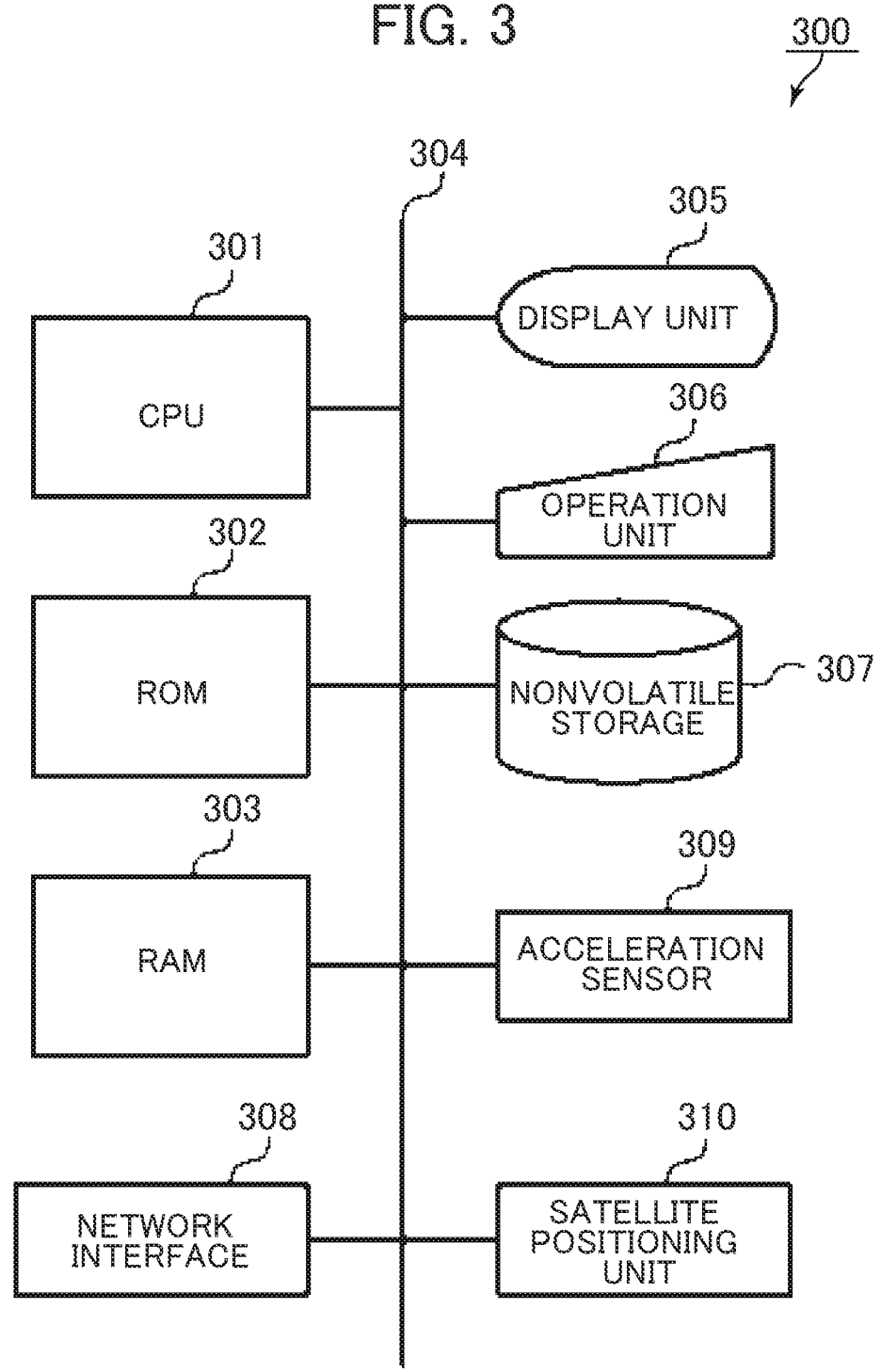
FIG. 3 is a block diagram showing a hardware configuration example of a mobile information terminal according to the first embodiment of the present invention.

FIG. 3 is a block diagram showing a hardware configuration example of the mobile information terminal 110. Hereinafter, the hardware configuration of a computer 300 included in the mobile information terminal 110 will be explained. Here, if the information terminal 130 is a mobile information terminal, the hardware configuration of the information terminal 130 can be realized by the configuration shown in FIG. 3.

The computer 300 includes a CPU (central processing unit) 301, a ROM (read only memory) 302, and a RAM (random access memory) 303 each of which is connected to a bus 304. In addition, the computer 300 includes a display unit 305, an operation unit 306, a nonvolatile storage 307, a network interface 308, an acceleration sensor 309, and a satellite positioning unit 310.

The CPU 301 reads out software program codes that realize various functions regarding this embodiment (such as the function of the sensor data obtention unit 112) from the ROM 302, and executes the software program codes. Here, it is also conceivable that the computer 300 includes a processing device such as an MPU (micro-processing unit) instead of the CPU 301. If the information terminal 130 is the same type of information terminal as the mobile information terminal 110, program codes that realize the function of the state evaluation result notification unit 131 are stored in the ROM 302.

Variables, parameters, and the like, which are generated in the middle of arithmetic processing, are temporarily stored in the RAM 303. The display unit 305 is, for example, a liquid crystal display monitor, and displays the result of processing performed by the computer 300 and the like. As the operation unit 306, a touch panel is used for example, and a user can perform input operations and instruction operations by touching the operation unit 306.

As the nonvolatile storage 307, an HDD (hard disk drive), an SSD (solid state drive), a flexible disk, an optical disk, a magneto optical disk, a CD-ROM, a CD-R, a magnetic tape, a nonvolatile memory card, or the like can be used for example. Programs that make the computer 300 properly function as well as an OS and various parameters can be recorded in this nonvolatile storage 307. For example, programs and data that realize the function of the sensor data obtention unit 112 and the like can be stored in the nonvolatile storage 307.

The network interface 308 is connected to the network N1, which is included in a mobile communication system, via, for example, an access point, and performs communication with the vehicle state monitoring apparatus 120 connected to the network N1 under the control of the CPU 301. If the information terminal 130 is the same type of information terminal as the mobile information terminal 110, the network N2 can be the same type of network as the network N1.

The acceleration sensor 309 is one example of the sensors 111 of the mobile information terminal 110, and measures acceleration (the change rate of velocity). Although a three-axis acceleration sensor can be used as the acceleration sensor 309, the measurement method of the acceleration sensor 309 is not limited to a specific method. Here, by integrating acceleration data obtained from the acceleration sensor 309, the CPU 301 can calculate the relevant velocity.

The satellite positioning unit 310 is a receiver of the satellite positioning system, and one example of the sensors 111 of the mobile information terminal 110. For example, a receiver of a GPS (global positioning system) can be used as the satellite positioning unit 310. The GPS receiver calculates distances between itself and plural GPS satellites by receiving electric waves from the plural satellites, and measures the present position of a mobile information terminal on which the GPS receiver is mounted (positional information). Here, by differentiating satellite positioning data obtained from the satellite positioning unit 310, the CPU 301 can calculate the relevant velocity.

[Hardware Configuration Example of Vehicle State Monitoring Apparatus]

Next, the hardware configuration of the vehicle state monitoring apparatus 120 will be explained.

Figure 4:
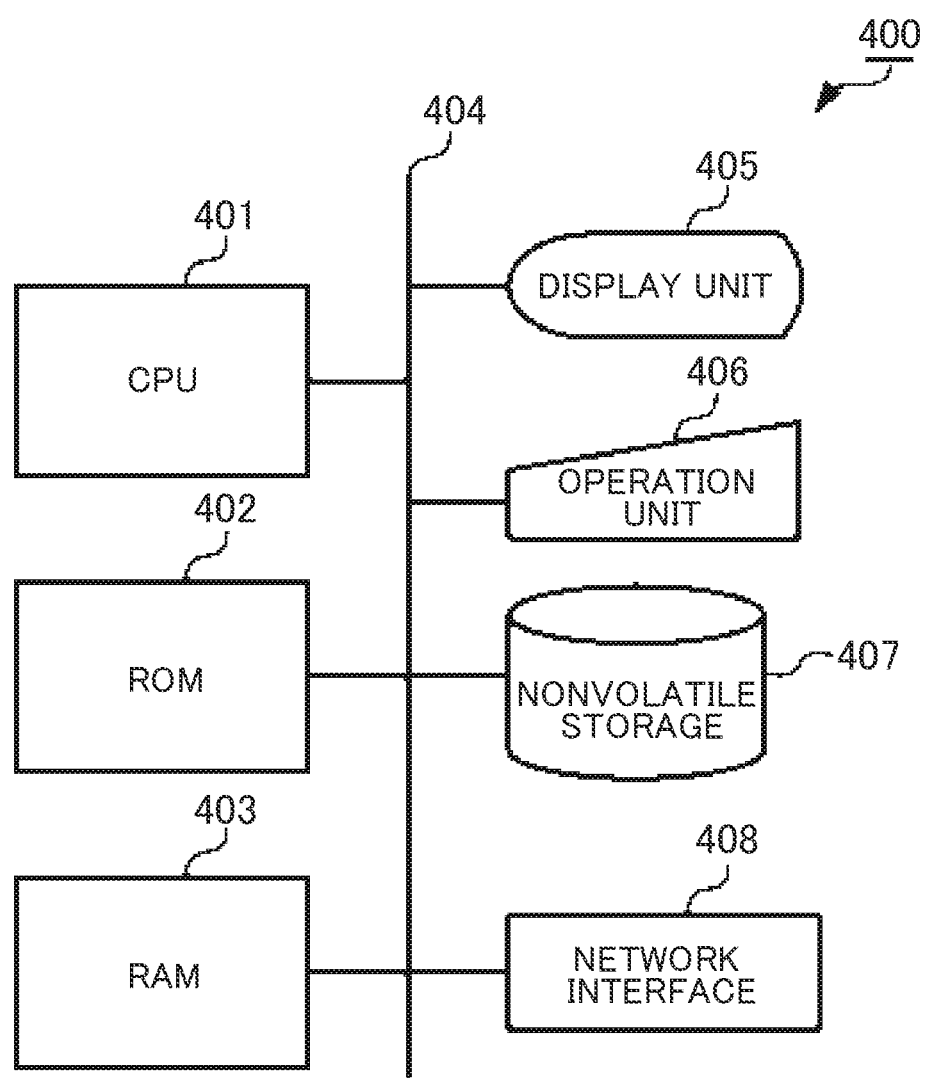
FIG. 4 is a block diagram showing a hardware configuration example of a vehicle state monitoring apparatus according to the first embodiment of the present invention.

FIG. 4 is a block diagram showing a hardware configuration example of the vehicle state monitoring apparatus 120. Here, the hardware configuration of a computer 400 included in the vehicle state monitoring apparatus 120.

The computer 400 includes a CPU 401, a ROM 402, and a RAM 403 each of which is connected to a bus 404. The computer 400 further includes a display unit 405, an operation unit 406, a nonvolatile storage 407, and a network interface 408.

The CPU 401 reads out software program codes that realize various functions regarding this embodiment from the ROM 402, and executes the software program codes. Here, it is also conceivable that the computer 400 includes a processing device such as an MPU (micro-processing unit) instead of the CPU 401. Here, by integrating acceleration data transmitted from the mobile information terminal 110, the CPU 401 can calculate the relevant velocity. Furthermore, by differentiating satellite positioning data transmitted from the mobile information terminal 110, the CPU 401 can calculate the relevant velocity.

Variables, parameters, and the like, which are generated in the middle of arithmetic processing, are temporarily stored in the RAM 403. The display unit 405 is, for example, a liquid crystal display monitor, and displays the result of processing performed by the computer 400 and the like. As the operation unit 406, a keyboard, a mouse, or a touch panel is used for example, and a user can perform predefined input operations and instruction operations.

As the nonvolatile storage 407, an HDD, an SSD, a flexible disk, an optical disk, a magneto optical disk, a CD-ROM, a CD-R, a magnetic tape, a nonvolatile memory card, or the like can be used for example. Programs that make the computer 400 properly function as well as an OS and various parameters can be recorded in this nonvolatile storage 407. For example, programs that realize the functions of the respective block units shown in FIG. 1 can be stored in the nonvolatile storage 407.

The network interface 408 is connected to the network N2 and performs communication with the information terminal 130 connected to the network N2 under the control of the CPU 401. If the information terminal 130 is a personal computer, the Internet or a LAN can be used as the network N2. As the network interface 408, an NIC (network interface card) is used, for example, and the vehicle state monitoring apparatus 120 transmits various kinds of data to the information terminal 130 via the network N2 and vice versa. Here, if the communication protocol of the network N1 and the communication protocol of the network N2 are different from each other, the computer 400 of the vehicle state monitoring apparatus 120 provides network interfaces in conformity with the communication protocols of the respective networks.

If the information terminal 130 is a personal computer, the hardware configuration of the information terminal 130 can be made as shown in FIG. 4.

[Steps of Vehicle State Monitoring Method]

Next, the steps of a vehicle state monitoring method executed in the vehicle state monitoring system 100 according to this embodiment will be explained.

First, the vehicle state monitoring apparatus 120 obtains learning data 200, and creates the estimation device 123a, which estimates the state quantity of the automobile C on the basis of sensor data obtained from the mobile information terminal, in advance using the estimation device learning unit 123 before executing monitoring on the state of the automobile C. After an automobile that is equipped with a sensor capable of measuring the state quantity of the automobile and is used for obtaining learning data is prepared, and a setting, in which both sensor data obtained from the sensor capable of measuring the state quantity of the automobile and sensor data obtained from the mobile information terminal can be measured, is prepared, the learning data 200 is obtained.

Next, the steps of a vehicle state monitoring method executed in the vehicle state monitoring system 100 after the estimation device 123a is created will be explained.

Figure 5:
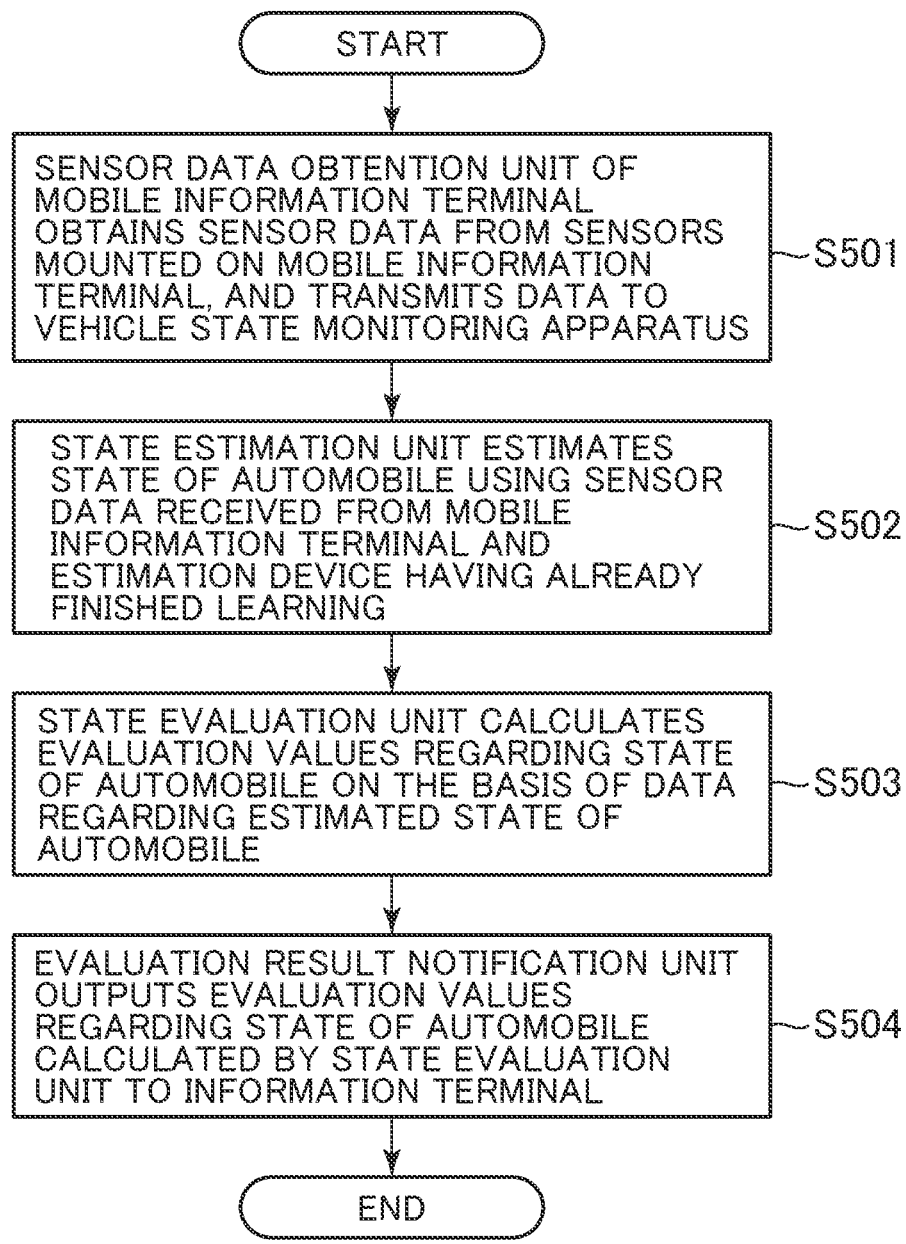
FIG. 5 is a flowchart showing the steps of a vehicle state monitoring method executed in the vehicle state monitoring system according to the first embodiment of the present invention after the creation of an estimation device.

FIG. 5 is a flowchart showing the steps of the vehicle state monitoring method executed in the vehicle state monitoring system 100 after the creation of the estimation device 123a. Through the execution of programs recorded in the ROM 302 by the CPU 301 of the mobile information terminal 110 (the computer 300 shown in FIG. 3), the process of Step S501 shown in FIG. 5 is executed. In addition, through the execution of programs recorded in the ROM 402 by the CPU 401 of the vehicle state monitoring device 120 (the computer 400 shown in FIG. 4), the processes of Step S502 to Step 504 shown in FIG. 5 are executed.

First, the sensor data obtention unit 112 of the mobile information terminal 110 in the automobile C obtains sensor data obtained from the sensors 111 mounted on the mobile information terminal 110, and transmits the sensor data to the vehicle state monitoring apparatus 120 via the network N1 (at Step S501). The data input unit 121 of the vehicle state monitoring apparatus 120 receives the sensor data from the mobile information terminal 110 via the network N1, and outputs the sensor data to the state estimation unit 122.

Next, the state estimation unit 122 estimates state quantities necessary for monitoring the state of the automobile C using the estimation device 123a having already finished learning and the sensor data received from the mobile information terminal 110 (at Step S502). The state estimation unit 122 outputs the estimated state quantities of the automobile C (state estimation values) to the state evaluation unit 124.

Next, the state evaluation unit 124 calculates evaluation values regarding the state of the automobile C such as safety and dangerousness on the basis of the state quantities estimated by the state estimation unit 122 (at Step S503). Subsequently, the evaluation result output unit 125 transmits the evaluation values regarding the state of the automobile C obtained by the state evaluation unit 124 to the information terminal 130 via the network N2 as an evaluation result.

Lastly, the state evaluation result notification unit 131 of the information terminal 130 displays the evaluation values regarding the state of the automobile C transmitted from the vehicle state monitoring apparatus 120 on the screen of the information terminal 130 (for example, on the display unit 305 shown in FIG. 3)(at Step S504). After the process of Step S504, the vehicle state monitoring system 100 finishes a series of processes of the vehicle state monitoring method.

[Estimation Device Creation Method]

Discussion is given here on the monitoring of the state of an automobile (for an example, the effectiveness of the brake of the automobile) using the vehicle state monitoring apparatus 120 as an application example of this embodiment.

In order to monitor the state of the brake (brake mechanism) of the automobile, although it is necessary to grasp at least whether there is the motion of the brake or not, a sensor that is able to directly detect the motion of the brake is not mounted on the mobile information terminal 110. Therefore, in this embodiment, the estimation device 123a that is able to detect the motion of the brake is created in advance on the basis of the sensor data of the mobile information terminal 110 using the estimation device learning unit 123.

After an automobile that is equipped with a sensor capable of detecting the motion of the brake of the automobile is prepared, and a setting, in which both sensor data obtained from the sensor capable of detecting the motion of the brake and sensor data obtained from the mobile information terminal can be measured, is prepared, learning data necessary for creating the estimation device 123a is obtained. As the sensor capable of detecting the motion of the brake, a switch that detects the position of the pedal of a foot brake is used, for example. Furthermore, it is conceivable that CAN (controller area network) data that can collect various pieces of information regarding the motions of an automobile including the motion of the brake of the automobile is used for the detection of the motion of the brake. When learning data regarding an automobile is obtained, it is desirable that the learning data should be obtained after the automobile is driven over an adequately long distance and for an adequately long time. Here, in this embodiment, it will be assumed that acceleration and velocity can be obtained or can be calculated as sensor data of the mobile information terminal 110.

The estimation device 123a is created using the learning data as follows. If the gradient of a road surface is negligible, the motion equation in the traveling direction of an automobile is given by Equation (1).

$$ma = f - \mu m g - (½)\rho A C_d V^2 \qquad (1)$$

In Equation (1), m is the mass of the automobile, and is the acceleration of the automobile. In addition, f is a driving force if f is positive, and f is a braking force if f is negative. Furthermore, g is a gravity acceleration, μ is a rolling resistance, ρ is an air resistance, $C_d$ is a drag coefficient, A is the frontal projected area, and V is the velocity of the automobile. a and V can be obtained from the sensor data of the mobile information terminal 110. On the other hand, the parameter values of m, μ, $C_d$, A, and the like are changed by the type of the automobile, and it is assumed that they cannot be known in advance. Equation (1) can be transformed into Equation (2).

$$a = -(½m)\rho A C_d V^2 + f/m - \mu g \qquad (2)$$

Judging from Equation (2), it can be understood that, in a plane coordinate system with one axis representing $V^2$ and the other axis representing a, data obtained when the brake of an automobile is activated (that is, f is negative) and data obtained when the brake is not activated (that is, f is positive) can be separated by a straight line shown by Equation (3) below.

$$a = -(½m)\rho A C_d V^2 - \mu g \qquad (3)$$

Figure 6:
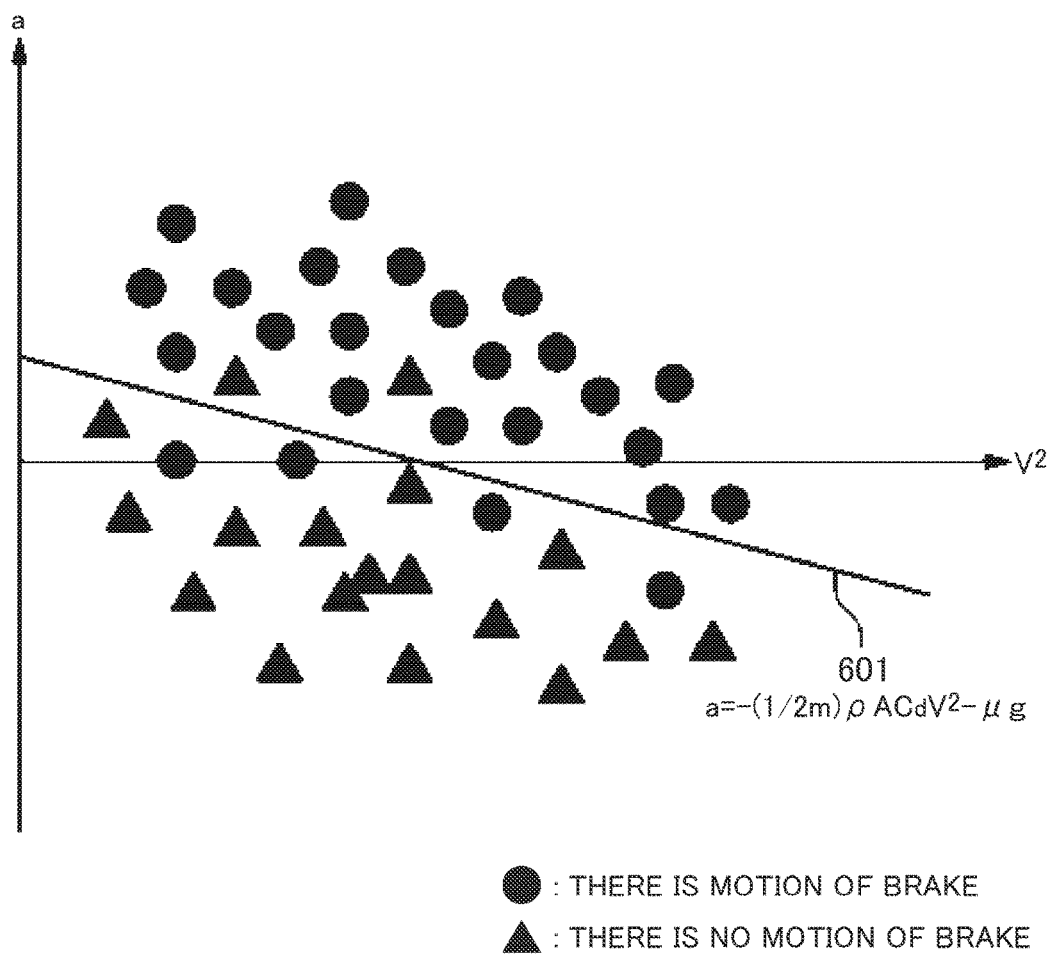
FIG. 6 is an explanatory diagram showing an example of a method for creating the estimation device using sensor data obtained from the mobile information terminal according to the first embodiment of the present invention.

FIG. 6 is an explanatory graph showing an example of a method for creating the estimation device 123a using sensor data obtained from the mobile information terminal 110. In FIG. 6, the horizontal axis represents the square of the velocity [$V^2$] of an automobile, and the vertical axis represents the acceleration [a] of the automobile. Sensor data represented by circles is data in the case of the presence of the motions of the brake of the automobile, and sensor data represented by triangles is data in the case of the absence of the motions of the brake. Most of the sensor data represented by the circles are positioned over the straight line 601, and most of the sensor data represented by the triangles is positioned under the straight line 601.

The above Equation (3) is an equation corresponding to the straight line 601 that separates the data in the case of the presence of the motions of the brake from the data in the case of the absence of the motions of the brake. Although the respective coefficients of Equation (3) corresponding to this straight line 601 are not known, if data in the case of the presence of the motions of the brake and data in the case of the absence of the motions of the brake shown in FIG. 6 can be distinguished from each other by a sensor capable of detecting the motion of the brake, the straight line 601 can be obtained by machine learning using a support vector machine or the like. With the use of this straight line 601, it becomes possible to estimate whether there is the motion of the brake or not as the state of the automobile on the basis of the sensor data of the mobile information terminal 110. In the following descriptions, the straight line 601 is used as an estimation device 123a having already finished learning.

[State Estimation Method]

Figure 7:
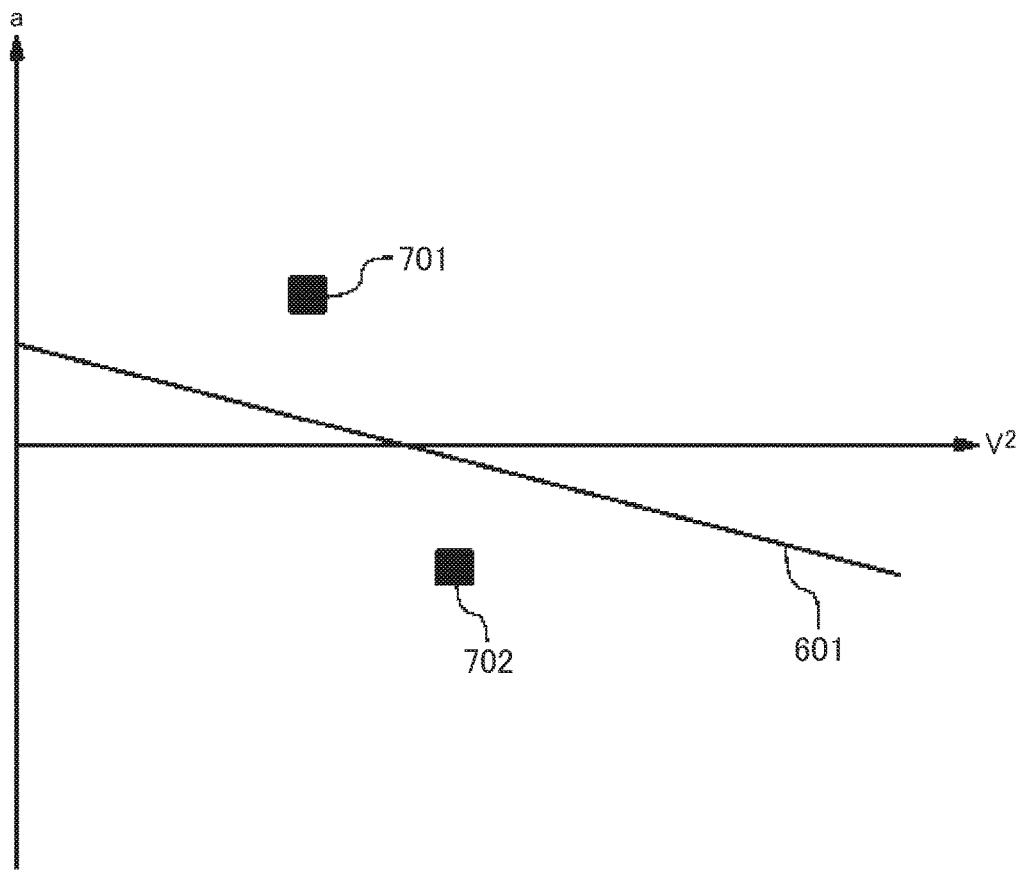
FIG. 7 is an explanatory diagram showing an example of a method for estimating the state of a monitoring-target vehicle on the basis of measurement data obtained from sensors in the monitoring-target vehicle according to the first embodiment of the present invention.

Next, the flow of the processing according to this application example after the estimation device 123a that estimates the presence or absence of the motion of a brake will be explained. FIG. 7 shows an example of a method for estimating the state of the automobile C on the basis of measurement data obtained from the sensors in the automobile C. The square of the velocity [$V^2$] of the automobile is represented by the horizontal axis of FIG. 7, and the acceleration [a] of the automobile is represented by the vertical axis of FIG. 7.

First, the sensor data obtention unit 112 of the mobile information terminal 110 in the automobile C obtains the acceleration data and velocity data of the automobile C as the sensor data obtained from the mobile information terminal 110. Subsequently, the sensor data obtention unit 112 transmits these acceleration data and velocity data to the vehicle state monitoring apparatus 120 (corresponding to Step S501).

Next, the state estimation unit 122 of the vehicle state monitoring apparatus 120 estimates the presence or absence of the motion of the brake of the automobile C using the acceleration data and velocity data obtained from the mobile information terminal 110 and the estimation device 123a having already finished learning (corresponding to Step S502). To put it concretely, whether the obtained data composed of the acceleration and the velocity (measurement data) is positioned over the straight line 601 or under the straight line 601 is judged. The state estimation unit 122 judges that there is the motion of the brake if an acceleration a satisfies Inequality $a > -(½m)\rho AC_d V^2 - \mu g$ as shown by measurement data 701 in FIG. 7, and judges that there is no motion of the brake if an acceleration a satisfies Inequality $a \leq -(½m)\rho AC_d V^2 - \mu g$ as shown by measurement data 702.

Next, the state evaluation unit 124 executes evaluation regarding the state of the automobile C on the basis of the presence or absence of the motion of the brake that is the estimated state of the automobile C, and the acceleration and velocity that are the sensor data of the mobile information terminal 110 (corresponding to Step S503). Subsequently, the evaluation result output unit 125 transmits the evaluation result obtained by the state evaluation unit 124 to the information terminal 130 (corresponding to Step S504). For example, the state evaluation unit 124 executes evaluation on at least one item out of the state of the brake of the automobile C, the present abnormality degree of the automobile C, and the transition of the abnormality degree of the automobile C (refer to FIG. 9 to be hereinafter described).

Figure 8:
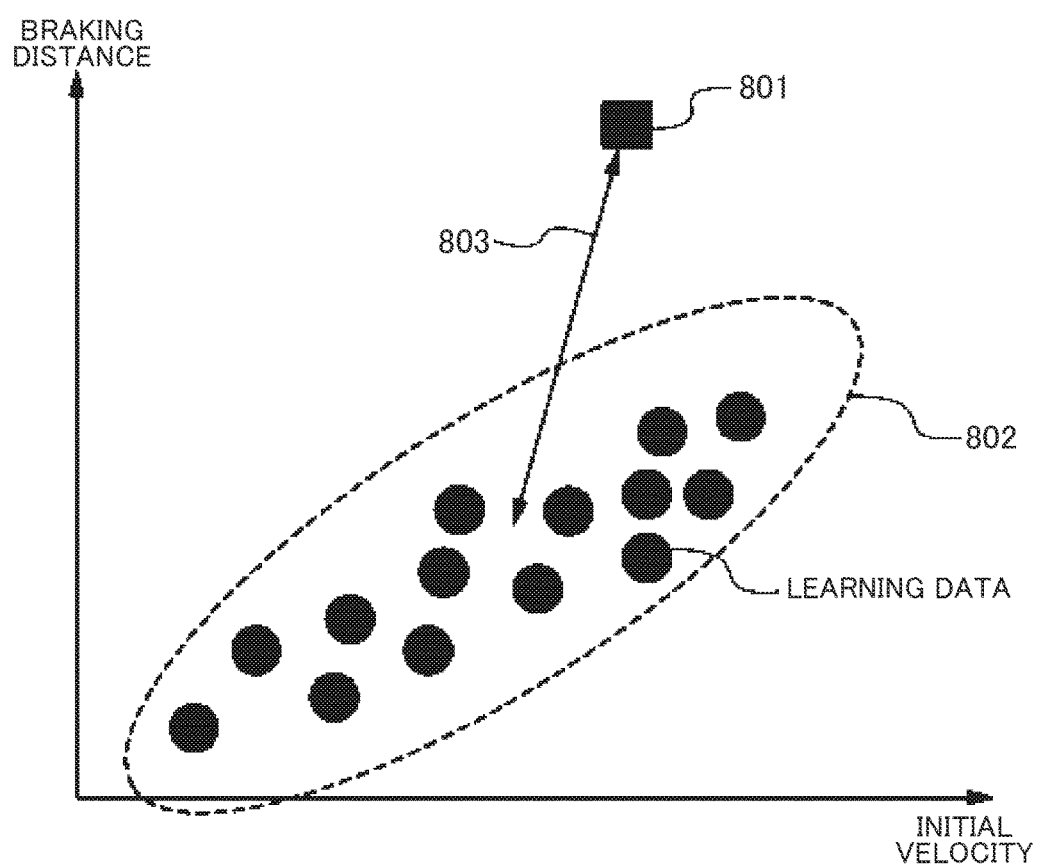
FIG. 8 is a graph showing an example of a relationship between the initial velocity and the braking distance of the monitoring-target vehicle according to the first embodiment of the present invention.

As for this evaluation method, as shown in FIG. 8, the evaluation is executed in such a way that the velocity of the automobile C when the brake of the automobile C begins working is set as an initial velocity, and a distance over which the automobile C is driven from the time when the brake begins working to the time when the automobile C stops is set as a braking distance, and that, through monitoring the relationship between the initial velocity and the braking distance, the difference between the estimation value of the braking distance estimated from the initial velocity and the actual braking distance is calculated as the abnormality degree. The vehicle state monitoring apparatus 120 collects data regarding initial velocities and driving distances as learning data in advance, and stores them in the nonvolatile storage 407 and the like. As a driving distance over which the automobile is driven until the automobile stops gets longer, the abnormality degree becomes larger. In the case where the abnormality degree is larger than a predefined value, the state evaluation unit 124 judges that the effectiveness of the brake is bad, that is, the state of the brake is abnormal.

FIG. 8 is a graph showing an example of a relationship between the initial velocity and the braking distance of an automobile. The horizontal axis represents the initial velocity and the vertical axis represents the driving distance in FIG. 8. It is conceivable that the calculation of abnormality is executed by calculating a distance between a measurement datum 801 and a data group 802 (surrounded by a dashed line) composed of normal learning data using, for example, a Mahalanobis distance 803 or the like. The Mahalanobis distance is used for dealing with multidimensional data pieces which are correlated with each other. For example, the Mahalanobis distance is used in the case where, after the pattern of data is learned using unsupervised learning, data that is extremely removed from these data pieces is detected as an abnormal value.

Lastly, the state evaluation result notification unit 131 of the information terminal 130 displays the evaluation result regarding the automobile C transmitted from the evaluation result output unit 125 of the vehicle state monitoring apparatus 120 on the screen of the information terminal 130.

Figure 9:
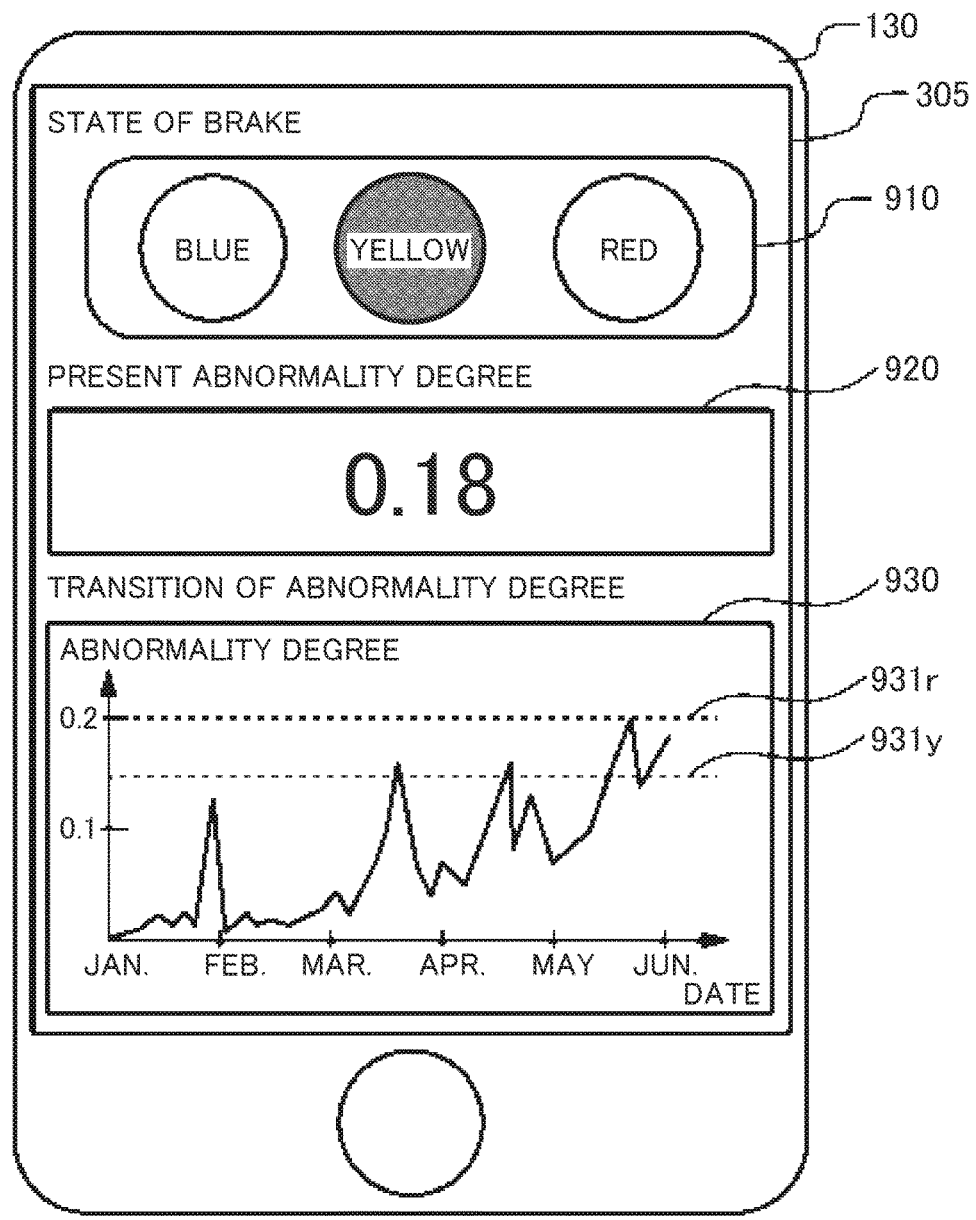
FIG. 9 is an explanatory diagram showing an example of an evaluation result regarding the state of the monitoring-target vehicle displayed on an information terminal.

FIG. 9 shows an example of an evaluation result regarding the state of the automobile C displayed on the information terminal 130.

A brake state display area 910, a present abnormality-degree display area 920, and an abnormality-degree transition display area 930 are set up on the screen (the display unit 305) of the information terminal 130.

In the brake state display area 910, the state of the brake of the automobile C is displayed with a blue sign (normal), a yellow sign (a little abnormal), or a red sign (abnormal) in a similar way that a blue sign, a yellow sign, or a red sign of a traffic signal installed on a road is turned on and off. Furthermore, in the present abnormality-degree display area 920, the value of the present abnormality degree of the brake is displayed. In addition, in the abnormality-degree transition display area 930, the transition of the abnormality degree of the brake from past (for example, from five months ago) to present is displayed in a graph. In the abnormality-degree transition display area 930, a warning line 931r corresponding to the red display of the brake state display area 910, and a caution line 931y corresponding to the yellow display are displayed. Here, it is also conceivable that the display color (background color) of a region surrounded by the vertical axis, horizontal axis of the graph and the caution line 931y and the display color (background color) of a region surrounded by the caution line 931y, the warning line 931r and the vertical axis are made different from each other.

Since the brake state display area 910, the present abnormality-degree display area 920, and the abnormality-degree transition display area 930 are displayed on the screen of the information terminal 130 in such a way as mentioned above, a user can come in contact with various pieces of information, and can confirm and judge the state of the brake.

According to the above-described first embodiment, with the use of the sensor data obtained from the sensors 111 mounted on the mobile information terminal 110 in the automobile C (monitoring-target vehicle), information regarding the automobile C (the presence or absence the motion of the brake and the braking distance of the automobile C), which cannot be obtained from the vehicle diagnosis device mounted on an automobile such as an OBD, can be grasped, therefore the monitoring of the state of the automobile C (the state of the brake) is achieved.

In addition, according to the first embodiment, since not OBD data but the sensor data obtained from the sensors 111 mounted on the mobile information terminal 110 is utilized, it becomes possible to realize the monitoring of the state of the automobile C inexpensively and at a low additional cost.

Furthermore, in the first embodiment, an estimation device 123a that has learned the relationship between sensor data output from sensors 111 mounted on the mobile information terminal 110 disposed in an arbitrary automobile and the state quantities of the arbitrary automobile in advance is created beforehand. Subsequently, in the first embodiment, the state quantities of the automobile C are estimated on the basis of sensor data obtained from the sensors of the mobile information terminal 110 disposed in the automobile C using the this estimation device 123a, and the evaluation regarding the state of the automobile C is executed on the basis of these estimated state quantities. As a result, in the first embodiment, with the use of the estimation device 123a having already finished learning and the sensor data obtained from the sensors 111 mounted on the mobile information terminal 110, the monitoring of the state of the automobile C can be realized inexpensively and at a low additional cost and with a higher degree of accuracy.

In addition, although, in the above-described first embodiment, as the state of the brake of an automobile, the effectiveness of the brake is monitored, of course it is conceivable that the wear amounts of the brake pads of the automobile or the like are monitored instead of the effectiveness of the brake. In the case where the wear amounts of the brake pads are monitored, the estimation device 123a is created after learning data set including the replacement date of the brake pads (the delivery date of the automobile), the driving distance of the automobile after the brake pads are replaced, acceleration data obtained from the acceleration sensor 309, and the velocity data is prepared. The accelerator data and the velocity data are used for showing the roughness of the driving of a driver that has an effect on the wear amounts of the brake pads. The integrated value of driving distances can be obtained from the satellite positioning data of the satellite positioning unit 310. In addition, the velocity data can be obtained by differentiating the satellite positioning data of the satellite positioning unit 310, or by integrating the acceleration data of the acceleration sensor 309.

Second Embodiment

A second embodiment shows an example in which a vehicle state monitoring apparatus monitors the state of a brake (the effectiveness of the brake) of a vehicle (an automobile or the like) in consideration of the gradient of a road surface by additionally using external data. If a road surface has a gradient, a gravity component depending on the gradient is applied to an automobile in the traveling direction of the automobile (in a direction parallel with the road surface), so that a judgment whether there is the motion of the brake of the automobile or not is dependent on the gradient of the road surface. Therefore, it is also inevitable that the evaluation about the state of the brake of the automobile should be reconsidered in consideration of the gradient.

[Vehicle State Monitoring System]

Figure 10:
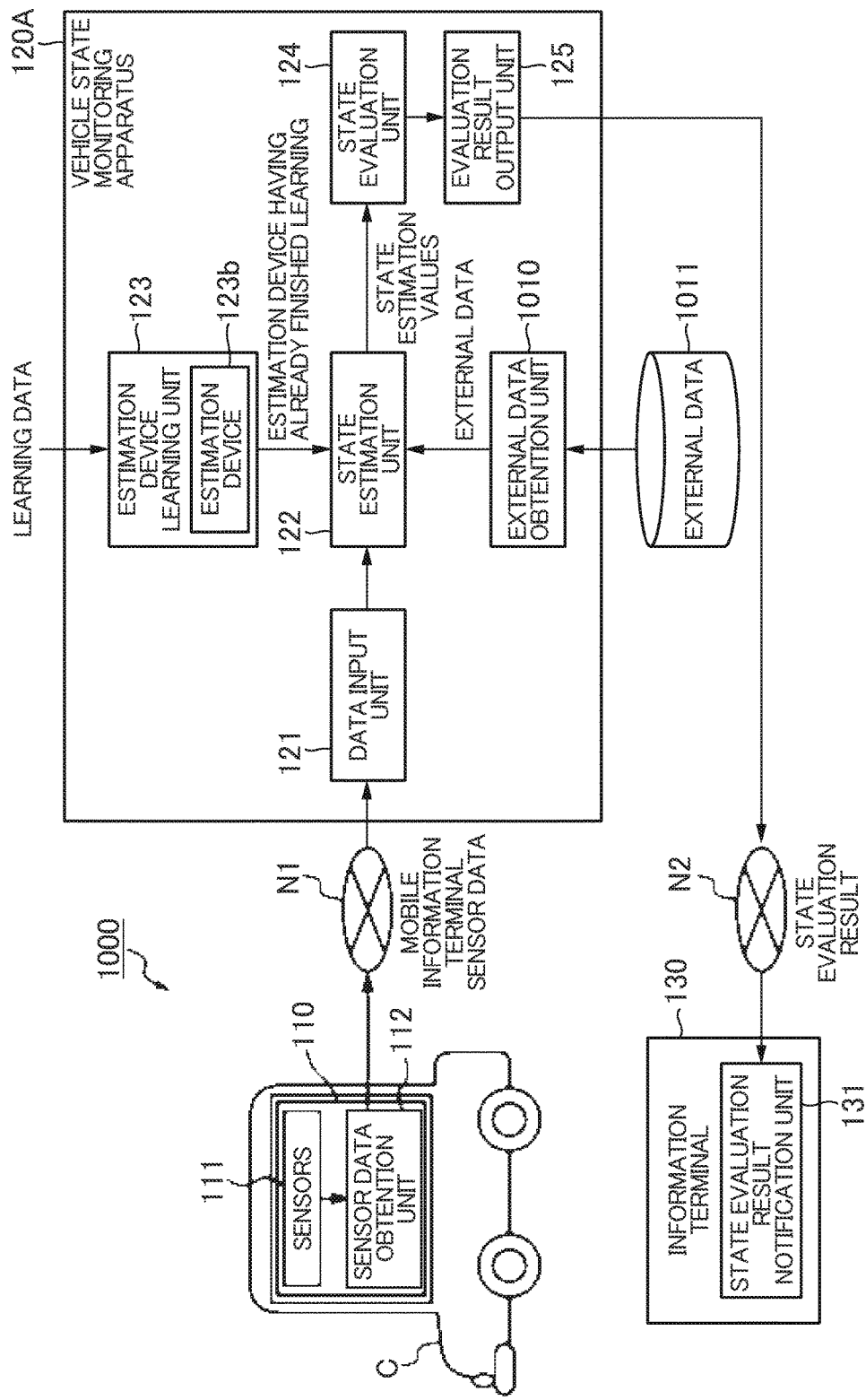
FIG. 10 is a schematic block diagram showing an example of the overall configuration of a vehicle state monitoring system according to a second embodiment of the present invention and the internal configurations of the respective devices.

FIG. 10 shows an example of the overall configuration of a vehicle state monitoring system according to the second embodiment of the present invention and the internal configurations of the respective devices. The vehicle state monitoring system 1000 shown in FIG. 10 includes a mobile information terminal 110, a vehicle state monitoring apparatus 120A, and an information terminal 130. Explanations about components shown in the vehicle state monitoring system 1000 that have the same reference signs as the reference signs of the components shown in the vehicle state monitoring system 100 in FIG. 1 (refer to FIG. 1) will be omitted.

[Vehicle State Monitoring Apparatus]

The vehicle state monitoring apparatus 120A is a computer having a calculation processing function and a storage function for accumulating and processing data transmitted from the mobile information terminal 110. The vehicle state monitoring apparatus 120A includes a data input unit 121, a state estimation unit 122, an estimation device learning unit 123, a state evaluation unit 124, and an evaluation result output unit 125, and further, it includes an external data obtention unit 1010. In other words, the vehicle state monitoring apparatus 120A is different from the vehicle state monitoring apparatus 120 according to the first embodiment in that the vehicle state monitoring apparatus 120A includes the external data obtention unit 1010, and the state estimation unit 122 estimates the state quantities of an automobile C in consideration of external data 1011 obtained from the external data obtention unit 1010.

In this embodiment, in the case where the state quantities of the automobile C are estimated in the state estimation unit 122, the external data 1011 such as map information and weather information is used in addition to sensor data obtained from the mobile information terminal 110. With this, the state quantities of the automobile C are estimated more accurately, which makes it possible to evaluate the state quantities of the automobile C more accurately.

The external data obtention unit 1010 obtains external data 1011 that is obtained from other than the mobile information terminal in the automobile and that is different from the sensor data of the mobile information terminal. For example, the external data obtention unit 1010 obtains external data 1011 such as weather information and map information including gradient information that are located on the Internet or in external databases as needed in such a case of receiving instructions, and transmits these data pieces to the state estimation unit 122.

For example, as map information including gradient information, altitude data (for example, numeric altitude data) issued by Geographical Survey Institute can be used. The values of altitudes are registered for the respective positions in the altitude data, so that a gradient between the start point and the end point of a certain distance can be calculated using the altitude data. Alternatively, map information used for a car navigation system can also be used if the map information includes gradient information. Furthermore, as the weather information, weather information provided by the Meteorological Agency and weather information service companies can be used.

Figure 11:
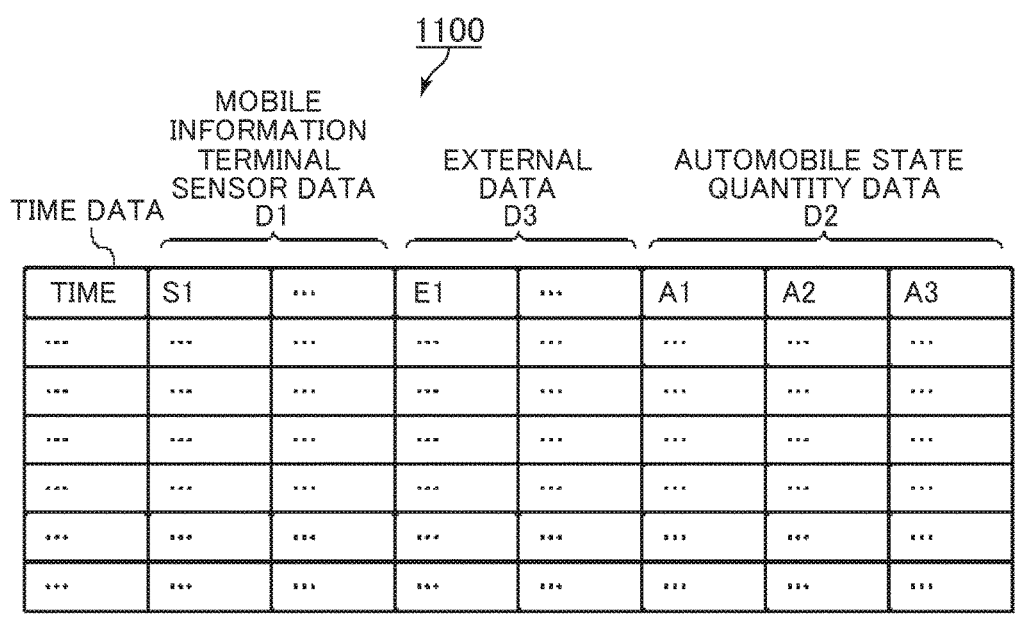
FIG. 11 is an explanatory diagram showing a configuration example of learning data according to the second embodiment of the present invention.

The estimation device learning unit 123 creates an estimation device 123b (an example of a state estimation device) that has learned the relationship between sensor data output from sensors included by a mobile information terminal disposed in an automobile, external data 1011, and the state quantities of the automobile in advance, and that estimates the state quantities of an arbitrary automobile. For example, the estimation device learning unit 123 uses data that is a combination of mobile information terminal sensor data (sensor values) D1, external data D3 (external data values), and automobile state quantity data D2 (state quantity data values) at each time as shown in FIG. 11 as learning data 1100. Subsequently, the estimation device learning unit 123 executes machine learning and the like using the learning data 1100, and creates the estimation device 123b that estimates the state quantities of the automobile on the basis of sensor data output from the sensors 111 included in the mobile information terminal 110 and the external data 1011.

(Configuration Example of Learning Data)

FIG. 11 shows a configuration example of learning data according to the second embodiment.

As shown in FIG. 11, learning data 1100 includes "time data", "mobile information terminal sensor data D1", "external data D3", and "automobile state quantity data D2". The mobile information terminal sensor data D1 has an item S1 and so on, the external data D3 has an item E1 and so on, and the automobile state quantity data D2 has an item A1, an item A2, and an item A3. In this embodiment, the mobile information terminal sensor data D1 is acceleration data, and the positional information of an automobile measured by a satellite measurement unit 310 (satellite positioning data), the external data D3 is map information (gradient information), and the automobile state quantity data D2 is information regarding the presence or absence of the brake motion of the automobile.

Returning to the explanation of the vehicle state monitoring apparatus 120A shown in FIG. 10, the state estimation unit 122 estimates state quantities necessary for evaluating the state of the automobile C on the basis of the sensor data obtained from the sensors of the mobile information terminal 110 in the automobile C and the external data 1011 using the estimation device 123b that has already finished learning and that is given by the estimation device learning unit 123.

[Steps of Vehicle State Monitoring Method]

Next, the steps of the vehicle state monitoring method in the vehicle state monitoring system 1000 according to this embodiment will be explained.

First, as is the case with the first embodiment, the vehicle state monitoring apparatus 120A obtains learning data 1100, and creates the estimation device 123b used for estimating the state quantities of the automobile C on the basis of the sensor data of the mobile information terminal in advance using the estimation device learning unit 123 before executing the monitoring of the state of the automobile C. The learning data 1100 is obtained after an automobile that is used for obtaining learning data and in which sensors capable of measuring the state quantities of the automobile are installed is prepared, and a setting in which both sensor data obtained from the sensors capable of measuring the state quantities of the automobile and sensor data obtained from the mobile information terminal can be measured at the same time is prepared.

Next, the steps of the vehicle state monitoring method in the vehicle state monitoring system 1000 after the estimation device 123b is created will be explained.

Figure 12:
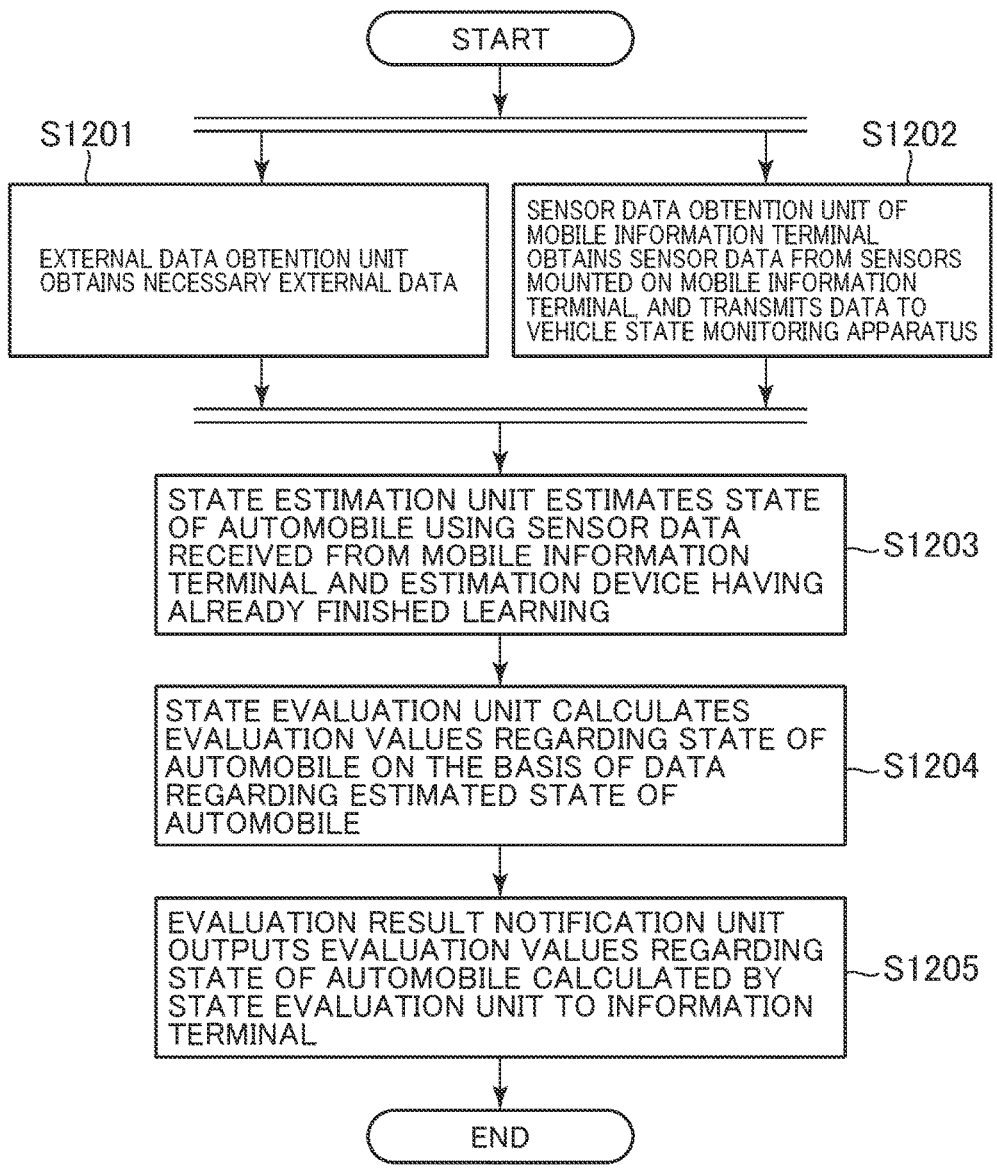
FIG. 12 is a flowchart showing the steps of a vehicle state monitoring method in the vehicle state monitoring system according to the second embodiment of the present invention after the creation of an estimation device.

FIG. 12 is a flowchart showing the steps of the vehicle state monitoring method in the vehicle state monitoring system 1000 after the estimation device 123b is created. Through the execution of programs stored in the ROM 402 made by the CPU 401 of the vehicle state monitoring apparatus 120A (the computer 400 in FIG. 4), the processes of Step S1201, Step S1203 to Step S1205 shown in FIG. 12 are executed. In addition, through the execution of programs stored in the ROM 302 made by the CPU 301 of the mobile information terminal 110 (the computer 300 in FIG. 3), the process of Step S1202 shown in FIG. 12 is executed. Here, the process of Step S1202 to the process of Step S1205 shown in FIG. 12 are the same as or corresponding to the process of Step S501 to the process of Step S504 shown in FIG. 5 respectively.

First, the external data obtention unit 1010 of the vehicle state monitoring apparatus 120A obtains necessary information such as meteorological information and map information from the external data 1011 (at Step S1201).

Furthermore, the sensor data obtention unit 112 of the mobile information terminal 110 in the automobile C obtains sensor data from the sensors 111 mounted on the mobile information terminal 110, and transmits the sensor data to the vehicle state monitoring apparatus 120A via the network N1 (at Step S1202). The data input unit 121 of the vehicle state monitoring apparatus 120A receives the sensor data from the mobile information terminal 110 via the network N1, and outputs the sensor data to the state estimation unit 122.

Next, the state estimation unit 122 estimates state quantities necessary for monitoring the state of the automobile C using the estimation device 123b having already finished learning, the sensor data received from the mobile information terminal 110, and the external data 1011 obtained by the external data obtention unit 1010 (at Step S1203). The state estimation unit 122 outputs the estimated state quantities (state estimation values) of the automobile C to the state evaluation unit 124.

Next, the state evaluation unit 124 calculates evaluation values regarding the state of the automobile C such as the safety and dangerousness of the automobile C on the basis of the state quantities estimated by the state estimation unit 122 (at Step S1204). Subsequently, the evaluation result output unit 125 transmits the evaluation values regarding the state of the automobile C calculated by the state evaluation unit 124 to the information terminal 130 via a network N2 as an evaluation result.

Lastly, the state evaluation result notification unit 131 of the information terminal 130 displays the evaluation values regarding the state of the automobile C transmitted from the vehicle state monitoring apparatus 120A on the screen of the information terminal 130 (for example, the display unit 305 shown in FIG. 3) (at Step S1205). After the process of Step S1205, the vehicle state monitoring system 1000 finishes a series of processes of the vehicle state monitoring method.

[Estimation Device Creation Method]

Discussion is given here on the monitoring of the state of an automobile (for an example, the effectiveness of the brake of the automobile) in consideration of the gradient of a road surface using the vehicle state monitoring apparatus 120A as an application example of this embodiment. In this embodiment, it will be assumed that acceleration, velocity, satellite positioning data (for example, GPS data) of the satellite positioning unit 310 can be obtained or calculated as the sensor data of the mobile information terminal. Furthermore, it will also be assumed that map information including gradient information is available as external data 1011.

An estimation device 123b that takes map information (gradient information) into consideration is created on the basis of learning data in the following way. If the gradient of a road surface over which an automobile is driven (the average gradient of the road surface) is represented by θ, the motion equation in the traveling direction of the automobile is given by Equation (4).

$$ma = f - \mu mg \cos \theta - (\tfrac{1}{2})\rho A C_d V^2 - mg \sin \theta \qquad (4)$$

Generally speaking, in comparison with the total length of the road over which the automobile is driven (driving distance), the length of a part of the road having a gradient is short, therefore Equation (4) can be approximated by Equation (5).

$$ma = f - \mu mg - (\tfrac{1}{2})\rho A C_d V^2 - mg\theta \qquad (5)$$

In Equation (4) and Equation (5), m is the mass of the automobile, and a is the acceleration of the automobile. In addition, f is a driving force if f is positive, and f is a braking force if f is negative. Furthermore, g is a gravity acceleration, μ is a rolling resistance, ρ is an air resistance, $C_d$ is a drag coefficient, A is the frontal projected area of the automobile, and V is the velocity of the automobile. a and V can be obtained from the sensor data of the mobile information terminal 110. In addition, θ can be obtained using satellite positioning data obtained by the satellite positioning unit 310 of the mobile information terminal 110 and map information including gradient information. On the other hand, the parameter values of m, μ, $C_d$, A, and the like are changed by the type of the automobile, and it is assumed that they cannot be known in advance. Equation (5) can be transformed into Equation (6).

$$a+g\theta=-(1/2m)\rho AC_d V^2+f/m-\mu g \quad (6)$$

Judging from Equation (6), it can be understood that, in a plane coordinate system with one axis representing $V^2$ and the other axis representing $a+\theta$, data obtained when the brake of an automobile is activated (that is, f is negative) and data obtained when the brake is not activated (that is, f is positive) is separated by a straight line shown by Equation (7) below.

$$a+g\theta=-(1/2m)\rho AC_d V^2-\mu g \quad (7)$$

Figure 13:
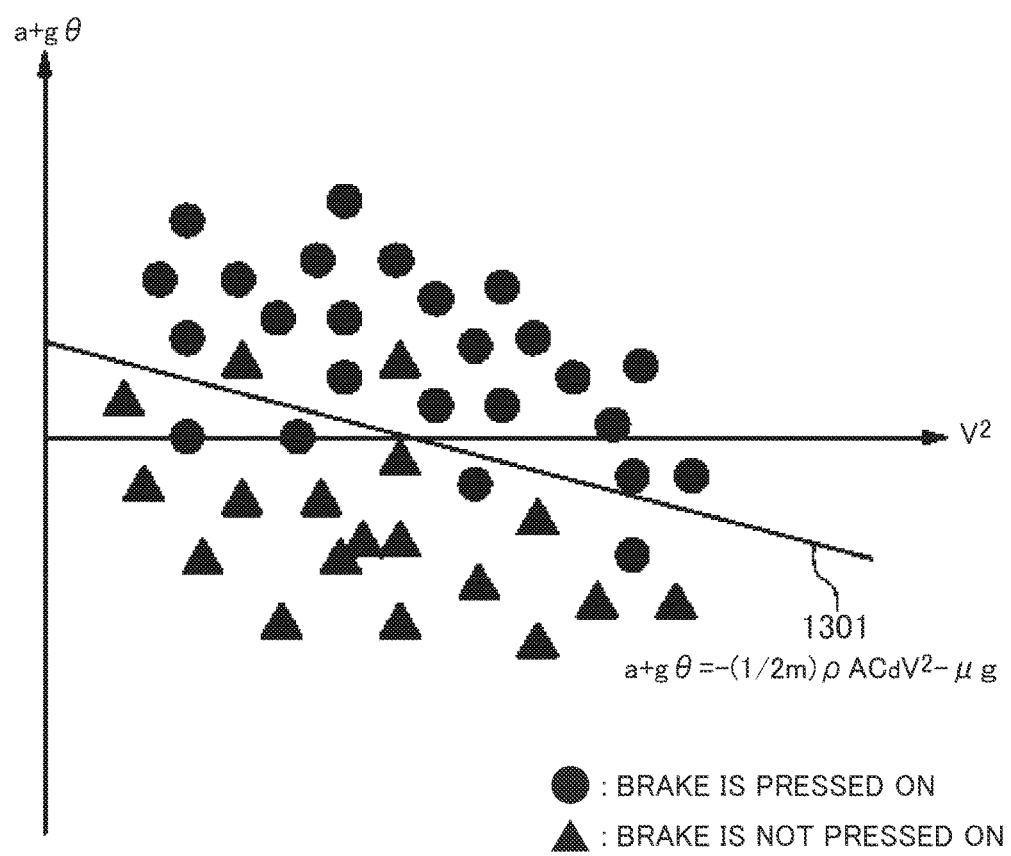
FIG. 13 is an explanatory diagram showing an example of a method for creating the estimation device using data obtained from a mobile information terminal according to the second embodiment of the present invention.

FIG. 13 is an explanatory graph showing an example of a method for creating the estimation device 123b using sensor data obtained from the mobile information terminal 110. In FIG. 13, the horizontal axis represents the square of the velocity [$V^2$] of an automobile, and the vertical axis represents the sum of the acceleration of the automobile plus a gravity component depending on a gradient [$a+g\theta$]. Sensor data represented by circles is data in the case of the presence of the motions of the brake of the automobile, and sensor data represented by triangles is data in the case of the absence of the motions of the brake. Most of the sensor data represented by the circles is positioned over the straight line 1301, and most of the sensor data represented by the triangles is positioned under the straight line 1301. For the purpose of explanation, the sensor data shown in FIG. 13 is set the same as the sensor data shown in FIG. 6; however in actuality, it is conceivable that they are different from each other.

As is the case with the straight line 601 shown in FIG. 6, the straight line 1301 can be obtained by machine learning using a support vector machine or the like. With the use of this straight line 1301, it becomes possible to estimate whether there is the motion of the brake or not in consideration of the gradient as the state of the automobile on the basis of the sensor data of the mobile information terminal 110 and external data 1101 (map information including gradient information). Hereinafter, the straight line 1301 is used as the estimation device 123b having already finished learning.

[State Estimation Method]

Figure 14:
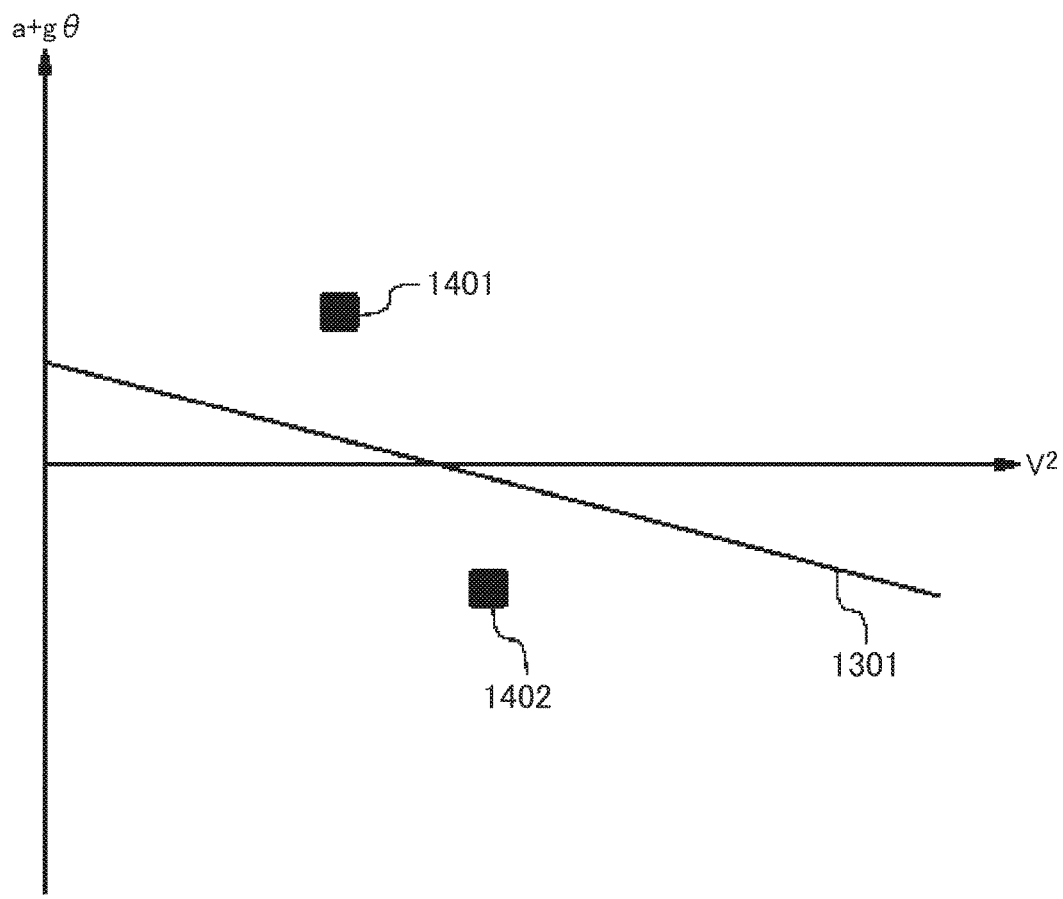
FIG. 14 is an explanatory diagram showing an example of a method for estimating the state of a monitoring-target vehicle on the basis of measurement data according to the second embodiment of the present invention.

Next, the flow of processes in this application example after the estimation device 123b that estimates the presence or absence of the motion of the brake in consideration of the gradient of a road surface is created will be explained. FIG. 14 shows an example of a method for estimating the state of the automobile C on the basis of measurement data obtained from the sensors in the automobile C. In FIG. 14, the horizontal axis represents the square of the velocity [$V^2$] and the vertical axis represents the sum of the acceleration of the automobile plus a gravity component depending on the gradient [$a+g\theta$]. The flow of the fundamental processes of this embodiment is the same as that of the first embodiment.

First, the external data obtention unit 1010 of the vehicle state monitoring apparatus 120A obtains map information including gradient information from the external data 1011 (corresponding to Step S1201). On the other hand, the sensor data obtention unit 112 of the mobile information terminal 110 in the automobile C obtains acceleration, velocity, and satellite positioning data as the sensor data of the mobile information terminal 110. Subsequently, the sensor data obtention unit 112 transmits these acceleration and velocity data to the vehicle state monitoring apparatus 120A (corresponding to Step S1202).

Next, the state estimation unit 122 of the vehicle state monitoring apparatus 120A estimates the presence or absence of the motion of the brake using the acceleration and velocity obtained from the mobile information terminal 110, the external data 1011 including the gradient information obtained by the external data obtention unit 1010, and the estimation device 123a having already finished learning (corresponding to Step S1203). To put it concretely, whether the obtained data composed of the acceleration, the velocity, and the gravity component data in the traveling direction (measurement data) is positioned over the straight line 1301 or under the straight line 1301 is judged. The state estimation unit 122 judges that there is the motion of the brake if an acceleration a satisfies Inequality $a+g\theta>-(1/2m)\rho AC_d V^2-\mu g$ as shown by a measurement datum 1401 in FIG. 14, and judges that there is no motion of the brake if an acceleration a satisfies Inequality $a+g\theta\leq-(1/2m)\rho AC_d V^2-\mu g$ as shown by measurement data 1402.

Subsequent steps, that is to say, the calculation of an evaluation result regarding the state of the automobile C executed by the state evaluation unit 124 (corresponding to Step S1204) and the display of the evaluation result regarding the state of the automobile C executed by the information terminal 130 (corresponding to Step S1205) are similar to the relevant steps executed in the first embodiment.

The above-described second embodiment brings about not only an advantageous effect similar to the advantageous effect that is brought about by the first embodiment by creating the estimation device 123b that estimates the state of the automobile C on the basis of the sensor data of the mobile information terminal 110, but also brings about the following advantageous effect. In the second embodiment, the state of the brake (the effectiveness of the brake) of the automobile C or the like can be monitored in consideration of the gradient of a road surface by means of map information including gradient information through the usage of map information including gradient information (external data 1011) made by the vehicle state monitoring apparatus 120A. In such a way, in the second embodiment, using map information including gradient information as external data makes it possible that the monitoring of the state of a vehicle such as an automobile is realized more accurately.

Here, although the state of the brake of an automobile is estimated using map information in the above-described second embodiment, it goes without saying that other information can be used for the same purpose. For example, because the driving distance of an automobile is dependent on a weather condition, the state of the brake of the automobile can be estimated using weather information instead of map information. Alternatively, it is also conceivable that the monitoring of the state of the brake of a vehicle such as an automobile is executed with a higher degree of accuracy by estimating the state of the brake of the vehicle using both map information and weather information.

Furthermore, it is also conceivable that a configuration in which the wear amounts of the brake pads of an automobile are monitored is set up in the second embodiment.

The present invention is not limited to the above-described embodiments, and it goes without saying that there are various kinds of application examples and modification examples without departing from the gist of the present invention described in the scope of the appended claims.

For example, the configurations of the vehicle state monitoring apparatuses and the vehicle state monitoring systems in the above-described embodiments have been described in detail and concretely for the purpose of explaining the present invention in an easily understood manner, therefore the present invention is not always required to include all the configurations described in the above-described embodiments. In addition, apart of the configuration of one embodiment can be replaced with a part of the configuration of the other embodiment. Furthermore, a new embodiment may be made by adding apart of the configuration of one embodiment to the configuration of the other embodiment. In addition, a new embodiment of the present invention may be made by adding a different configuration to a part of the configuration of each embodiment, deleting a part of the configuration from each embodiment, or replacing a part of configuration of each embodiment with a different configuration.

In addition, the entireties or parts of the above configurations, functions, processing units, processing means, and the like can be realized by hardware manufactured by, for example, integrated circuits.

Alternatively, each of the components of the vehicle state monitoring apparatuses 120 and 120A according to the embodiments disclosed in the present invention can be implemented in any of pieces of hardware as long as the respective pieces of hardware can transmit to or receive from each other via networks. Furthermore, a process that is to be carried out by a certain processing unit can be carried out by one piece of hardware or it can be carried out by plural pieces of hardware in a distributed processing manner.

What is claimed is:

1. A vehicle state monitoring apparatus comprising:
    a state estimation unit that estimates state quantities of a monitoring-target vehicle on the basis of sensor data obtained from sensors mounted on a mobile information terminal in the monitoring-target vehicle using a state estimation device that has learned a relationship between sensor data obtained from sensors mounted on the mobile information terminal in an arbitrary vehicle and state quantities of the arbitrary vehicle in advance;
    a state evaluation unit that executes evaluation regarding a state of the monitoring-target vehicle on the basis of the state quantities of the monitoring-target vehicle estimated by the state estimation unit; and
    an evaluation result output unit that outputs a result of the evaluation regarding the state of the monitoring-target vehicle executed by the state evaluation unit.

2. The vehicle state monitoring apparatus according to claim 1, wherein the state estimation device has learned, as learning data,
    acceleration data and velocity data obtained from the sensors of the mobile information terminal and data regarding the presence or absence of a motion of a brake of the vehicle as a state quantity of the vehicle,
    the state estimation unit estimates the presence or absence of the motion of the brake of the monitoring-target vehicle on the basis of acceleration data and velocity data obtained from the mobile information terminal in the monitoring-target vehicle, and the state evaluation unit evaluates a state of the brake of the monitoring-target vehicle on the basis of the estimated presence or absence of the motion of the brake of the monitoring-target vehicle.

3. The vehicle state monitoring apparatus according to claim 1, further comprising an external data obtention unit that obtains external data, which is different from the sensor data, from other than the mobile information terminal of the monitoring-target vehicle,
    wherein the state estimation unit estimates the state quantities of the monitoring-target vehicle from the sensor data and the external data using the state estimation device.

4. The vehicle state monitoring apparatus according to claim 2, wherein the evaluation result output unit outputs the evaluation result regarding one or more items out of the state of the brake of the monitoring-target vehicle, a present abnormality degree of the monitoring-target vehicle, and the transition of an abnormality degree of the monitoring-target vehicle.

5. The vehicle state monitoring apparatus according to claim 3,
    wherein the external data obtention unit obtains map information including gradient information as the external data, and
    the state estimation unit utilizes acceleration data, velocity data, and satellite positioning data that shows a position of the mobile information terminal as the sensor data.

6. The vehicle state monitoring apparatus according to claim 1, further comprising an estimation device learning unit that creates the state estimation device after learning the relationship between sensor data obtained from sensors mounted on the mobile information terminal in the arbitrary vehicle and the state quantities of the arbitrary vehicle in advance.

7. A vehicle state monitoring system comprising:
    a mobile information terminal that is equipped with sensors and installed in a monitoring-target vehicle;
    a state estimation unit that estimates state quantities of the monitoring-target vehicle on the basis of sensor data obtained from the sensors mounted on the mobile information terminal in the monitoring-target vehicle using a state estimation device that has learned a relationship between sensor data obtained from sensors mounted on the mobile information terminal in an arbitrary vehicle and state quantities of the arbitrary vehicle in advance;
    a state evaluation unit that executes evaluation regarding a state of the monitoring-target vehicle on the basis of the state quantities of the monitoring-target vehicle estimated by the state estimation unit; and
    an evaluation result output unit that outputs a result of the evaluation regarding the state of the monitoring-target vehicle executed by the state evaluation unit.

8. A vehicle state monitoring method comprising the steps of: estimating state quantities of a monitoring-target vehicle on the basis of sensor data obtained from sensors mounted on a mobile information terminal in the monitoring-target vehicle using a state estimation device that has learned a relationship between sensor data obtained from sensors mounted on the mobile information terminal in an arbitrary vehicle and state quantities of the arbitrary vehicle in advance;
    executing evaluation regarding a state of the monitoring-target vehicle on the basis of the estimated state quantities of the monitoring-target vehicle; and
    outputting a result of the evaluation regarding the state of the monitoring-target vehicle.

* * * * *